United States Patent [19]

Foltz

[11] 4,054,428
[45] Oct. 18, 1977

[54] METHOD AND APPARATUS FOR REMOVING CARBON MONOXIDE FROM COMPRESSED AIR

[75] Inventor: Donald R. Foltz, Pittsburgh, Pa.

[73] Assignee: Hankison Corporation, Canonsburg, Pa.

[21] Appl. No.: 682,265

[22] Filed: May 3, 1976

[51] Int. Cl.² .............................................. B01D 53/04
[52] U.S. Cl. .................. 55/33; 23/288 FB; 55/62; 55/75; 55/316; 55/389; 423/247
[58] Field of Search ............ 23/288 FB, 288 FC; 55/33, 62, 74, 75, 316, 387, 389; 423/247

[56] References Cited
U.S. PATENT DOCUMENTS

| 1,596,060 | 8/1926 | Mase | 23/288 FB |
|---|---|---|---|
| 3,221,477 | 12/1965 | Arnoldi et al. | 55/33 X |
| 3,355,860 | 12/1967 | Arnoldi | 55/33 X |
| 3,359,706 | 12/1967 | Zankey | 55/33 X |
| 3,464,186 | 9/1969 | Hankison et al. | 55/387 X |
| 3,513,631 | 5/1970 | Seibert et al. | 55/33 |
| 3,643,402 | 2/1972 | Wireman | 55/33 |

*Primary Examiner*—Wilbur L. Bascomb, Jr.
*Assistant Examiner*—Robert H. Spitzer
*Attorney, Agent, or Firm*—Webb, Burden, Robinson & Webb

[57] ABSTRACT

The system for removing carbon monoxide from compressed air comprises two towers, each of which has a section containing a desiccant and an adjacent section containing hopcalite for converting the carbon monoxide to carbon dioxide. A four-way, reversible main valve communicates with the desiccant end of either tower. The hopcalite end of the towers is connected through a pressure reducer which reduces pressure of all the compressed air in the system. After the compressed air is dried and the carbon monoxide removed, the air passes through the desiccant containing moisture from a previous cycle so as to be rehumidified for its exit from the main valve and so as to regenerate the desiccant for a reverse cycle. The two towers may be side by side or may be concentrically positioned, in which case a common heat conducting wall assists in drying the moisture containing desiccant. The system operates with no loss of air and with no net gain or loss of moisture in the system.

10 Claims, 4 Drawing Figures

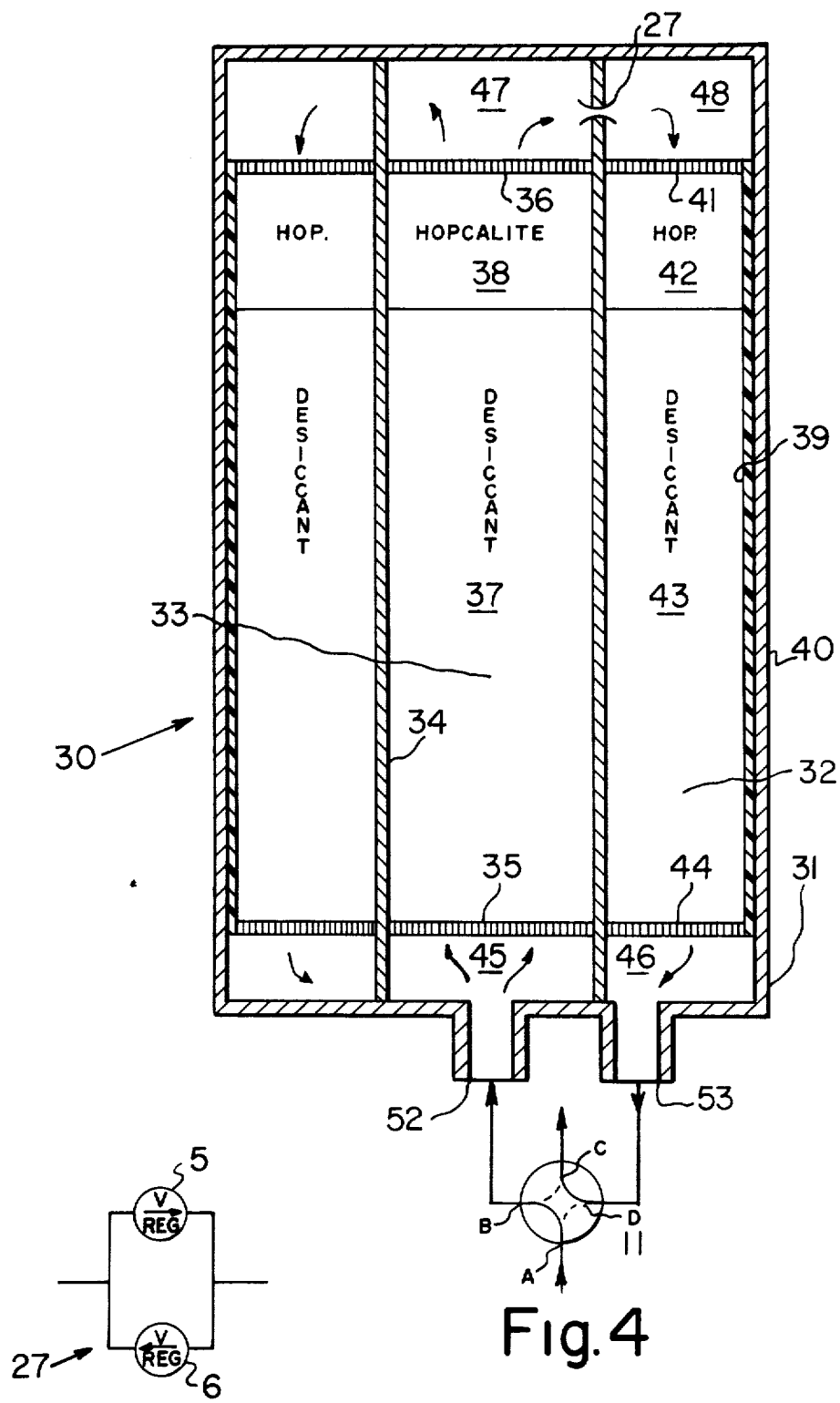

METHOD AND APPARATUS FOR REMOVING CARBON MONOXIDE FROM COMPRESSED AIR

FIELD OF THE INVENTION

My invention relates to a system for removing carbon monoxide from compressed air and, more particularly, to a continuous, reversible system which utilizes a pressure drop between towers to keep the system functioning and regenerate the moisture containing desiccant with no net loss or gain in moisture in the system.

DESCRIPTION OF THE PRIOR ART

Existing systems utilize a catalyst, generally known as hopcalite, which selectively oxidizes carbon monoxide to relatively nontoxic carbon dioxide. In order for this catalyst to continuously convert the carbon monoxide without losing its efficiency, it is necessary that the catalyst be protected from water or moisture in any form wich acts to "poison" the catalyst. For this reason, compressed air containing carbon monoxide must be dried to extremely low moisture levels. Normally desiccant air dryers are installed upstream of the catalyst bed to insure that the moisture content of the compressed air is reduced sufficiently (e.g., 4% relative humidity maximum) and the catalyst is essentially maintained dry.

Since the desiccants eventually become saturated with water, it is necessary to employ a cycling parallel drying system. The present systems consist of two parallel towers, each containing desiccant which is arranged so as to cycle on a predetermined time basis. While one tower is on-stream and drying the compressed air, the off-stream tower is being regenerated by having the water removed from the desiccant. This regeneration is normally accomplished by supplying heat to the desiccant, exposing the desiccant to a vacuum or purging the desiccant bed with dry air. Once the desiccant has been regenerated in the tower which is offstream, the air flow cycle is reversed and the tower which has been on-stream is regenerated as the newly regenerated tower commences to dry the air.

In a compressed air purification system, the most common way to dry the desiccant is to take a portion of the compressed air which has been dried and pass it through the tower to be regenerated. This purge air is normally heated and also reduced in pressure so as to decrease its humidity and increase its capacity to remove moisture from the desiccant bed. In the present systems, the purge air is vented to the atmosphere after it is utilized.

The present systems, therefore, use portions of dried, compressed air for desiccant bed regeneration therefore wasting this air to the atmosphere. In addition, the relative humidity of the compressed air which has been purified is so low that it is undesirable when this air is to be used continuously for breathing. Further, complex piping and check valve systems normally must be employed for this air purge and desiccant bed regeneration.

Some systems for room air purification have been devised which rely on the exothermic heat of the oxidation reaction of carbon monoxide to carbon dioxide to supply the energy to regenerate the tower. However, such a system requires a very high concentration of carbon monoxide since there is only about a 1.8° F air temperature rise for each 100 parts per million of carbon monoxide in the air. Therefore, electric heaters are added to the system to supply the energy necessary for bed reactivation, see for example, U.S. Pat. No. 3,672,824. Other systems utilize heat or vacuum regeneration with a blower pressure to overcome flow pressure losses, see for example, U.S. Pat. No. 3,355,860.

SUMMARY OF THE INVENTION

My system operates without the loss of any compressed air. In addition, the humidity of the compressed air is restored after purification for more comfortable breathing. In addition, there is no net gain or loss of water in the system once my system is stabilized. The only loss of air energy is due to the reduction of air pressure which is deliberately taken to assist the removal of the moisture from the desiccant bed being regenerated. Since all of the purified, compressed air is partially reduced in pressure, the regeneration is more efficient. Further, this can be accomplished without complex valving systems to accommodate different purges, etc.

My system includes a four-way, reversible main valve for receiving compressed air and directing it to a first tower which includes a desiccant and an adjacent catalyst such as hopcalite for converting carbon monoxide to carbon dioxide. A pressure reducer receives and reduces the pressure of all the compressed air from the first tower and directs it into a second tower which further converts carbon monoxide to carbon dioxide through the hopcalite, rehumidifies the air prior to the air's return through and out of the main valve and regenerates the desiccant bed. The towers may be side by side or one may be positioned concentrically within the other to further assist in desiccant bed regeneration.

BRIEF DESCRIPTION OF THE DRAWINGS

FIG. 3 is a schematic of the pressure reduction system; and

FIG. 4 is a schematic of another embodiment of my invention.

DESCRIPTION OF THE PREFERRED EMBODIMENTS

Figure 1:
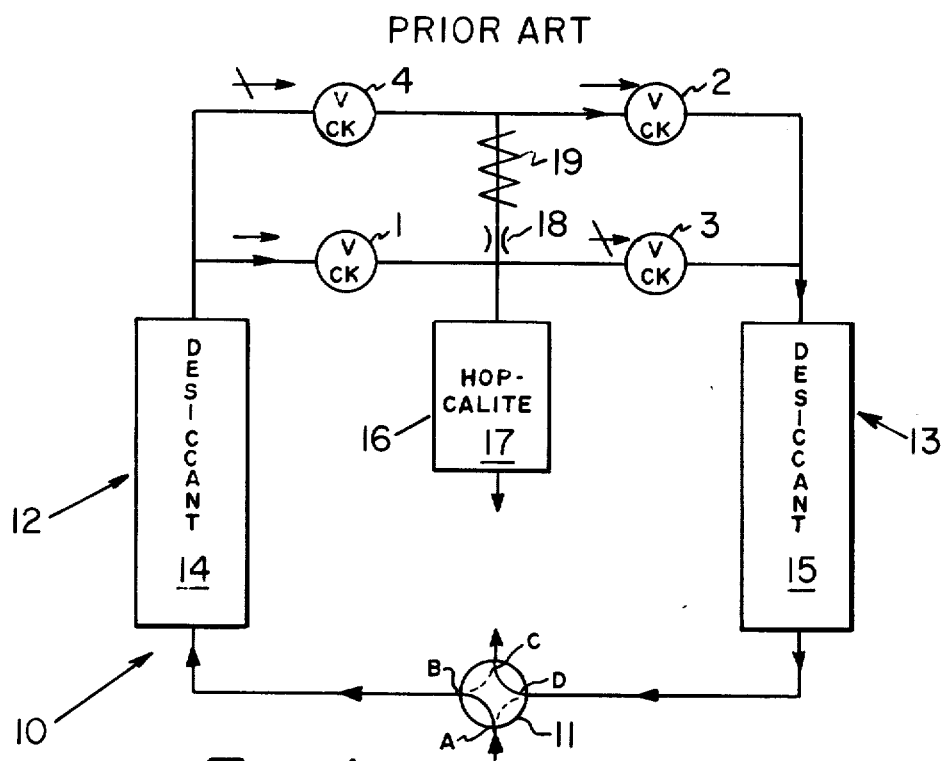
FIG. 1 is a schematic of a typical prior art air purifier.

The typical prior art compressed air system, generally designated 10, is illustrated in FIG. 1. A four-way valve 11 is timer controlled and power operated and can switch the flow circuits from port AB to port AD and concurrently switch the flow from port DC to port BC.

In communication with port AB of valve 11 is tower 12 which includes a desiccant 14 which dries the compressed air passing therethrough. A series of check valves 1, 2, 3 and 4 are employed to direct the main stream of the dried air into catalyst vessel 16 containing hopcalite 17 and the purge air into tower 13 which contains a moisture laden desiccant 15 from a previous cycle. Specifically, the compressed air is first routed through check valve 1 with the majority of the air entering catalyst vessel 16 where hopcalite 17 converts the carbon monoxide to the carbon dioxide. A portion of the dried air which passes through check valve 1 and which is controlled by the size of orifice 18 passes through a heater 19 and check valve 2 on the way to desiccant bed 13. This dry purge air, which is at a reduced pressure, regenerates the desiccant 15 of tower 13 and is thereafter purged to the atmosphere by passing through port DC of valve 11. At a predetermined time cycle, the compressed air inlet is routed to tower 13 through port AD of valve 11 and thereafterthe purge air passes through check valve 4 to regenerate the desiccant 14 and tower 12 in the same manner as the previous cycle.

Figure 2:
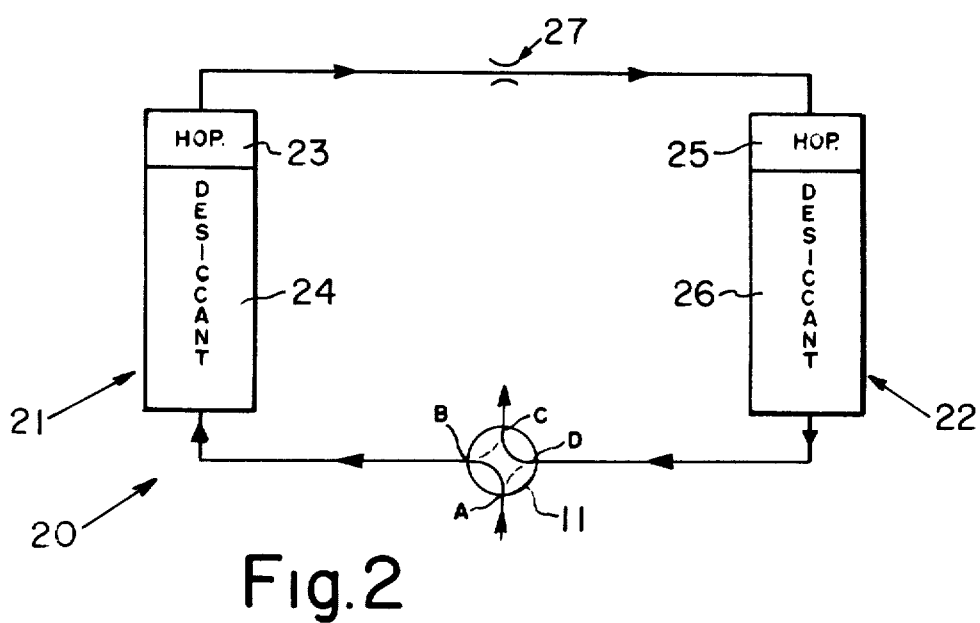
FIG. 2 is a schematic of my compressed air purifier.

My compressed air system, generally designated 20, is illustrated in FIG. 2. The compressed air enters the four-way valve 11 in precisely the same manner as the prior art valve, that is, valve 11 is a timer controlled power operated valve which can switch the direction of flow as previously described. Tower 21 receives the compressed air through port AB of valve 11. Tower 21 includes a desiccant bed 24 which dries the compressed air and a hopcalite bed 23 adjacent thereto which converts the carbon monoxide to carbon dioxide. Thereafter, all of the air emerging from tower 21 passes through a pressure reducing device 27 where the pressure of all the air is reduced. The air then enters tower 22 where it first passes through the hopcalite bed 25 which further reduces the carbon monoxide content. Thereafter, the air passes through the desiccant bed 26 which is adjacent the hopcalite bed 23 in tower 22 where it is rehumidified as it regenerates the desiccant bed which during a previous cycle had adsorbed moisture. The compressed air then passes out of tower 22 and through port DC of valve 11. The air is carbon monoxide free and is essentially at the same relative humidity as the air which first entered the system. At a predetermined time cycle, the valve 11 is reversed so that compressed air is routed to tower 22 through port AD which then results in tower 22 drying the air and tower 21 rehumidifying the air prior to its exit through port BC. The air exiting the respective towers is later expanded for inhalation purposes.

The pressure reducing device 27 actually includes two differential pressure regulator valves 5 and 6, each of which holds a constant pressure differential between their respective valve inlets and outlets and permits flow in only one direction, FIG. 3. The pressure reducing device 27, as detailed in FIG. 3, is utilized so that the pressure drop is maintained constant, irrespective of the total flow or of the flow direction. If the flow were constant, a simple orifice could be used to obtain the appropriate pressure drop, but such an orifice would not maintain the pressure drop constant at varying flows.

The particular desiccant utilized can be any one of several or a combination of known desiccants such as alumina, silica gel or a molecular sieve.

The pressure reduction required to regenerate the desiccant bed is dependent on such calculated mass transfer factors as contact time, heat of vaporization, heat of wetting, granular form, mass flow rate of air, cycling time, temperature of the air and desiccant bed, etc. Generally, an increase in pressure reduction results in more efficient regeneration. Regeneration occurs through the expansion of the pressure reduced air in accordance with Boyle's law and the increasing capacity to hold water vapor as a volume of air increases.

The amount of pressure reduction needed for a particular system can be reduced by utilizing the heat of adsorption liberated by the desiccant bed adsorbing water vapor to regenerate the bed desorbing water vapor. For example, a percentage decrease of operating pressure of less than 3% can be achieved by concentrically positioning the two towers, FIG. 4.

In the arrangement of FIG. 4, generally designated 30, an outer cylindrical casing 40 includes two access ports 52 and 53 at one end thereof. An inner annular tower 33 having a heat conducting annular metal wall 34 is positioned in communication with access port 52. A screen 35 is positioned at the bottom of tower 33 so as to form a small space 45 adjacent the access port 52 and a similar screen 36 is positioned near the top of tower 33 to form a small space 47 between the screen 36 and the top of the casing 40.

The second tower 32 is positioned concentrically about the inner tower 33 so that the heat conducting wall 34 is common to both. The outer wall 39 of tower 32 is of a plastic heat insulating material and is adjacent the casing 40. The outer tower 32 is in communication with access port 53. Tower 32 terminates at one end in screen 44 so as to create a small, annular space 46 adjacent the access port 53 and terminates at the other end in screen 41 so as to create a small, annular space 48 between the screen 41 and the top of the casing 40.

Tower 33 includes a desiccant bed 37 and an adjacent hopcalite bed 38 whereas the tower 32 includes an annular desiccant bed 43 and an annular hopcalite bed 42, both of which extend about the inner tower 33.

The embodiment of FIG. 4 operates as follows. Compressed air enters through port AB of valve 11 into access port 52 of casing 40 and the space 45 adjacent the access port 52 within tower 33. Thereafter, the compressed air passes through screen 35 where it is dried by desiccant 37 and as the air proceeds through the hopcalite bed 38, the carbon monoxide is converted to carbon dioxide. Thereafter, the compressed air passes through the screen 36 into the space 47 and through the pressure reducing device 27 which communicates through common wall 34 with outer tower 32.

Pressure reducing device 27 performs the same function as previously described and all of the compressed air passes through screen 41 into hopcalite bed 42 where the carbon monoxide content of the compressed air is further reduced. The compressed air then enters desiccant bed 43 where it is rehumidified and where it regenerates bed 43 which during the previous cycle had adsorbed moisture. The air then passes out of tower 32 through screen 44, space 46 and access port 53 into port DC of valve 11 where it can then be expanded and used since it is at the same relative humidity as the air which first enters the system. At the predetermined time cycle, the compressed air inlet in routed through port AD of valve 11 and the entire cycle is reversed so that the air exits through access port 52 and port BC of valve 11.

By concentrically positioning the towers, certain advantages result with regard to the conservation of energy within the system. While one of the desiccant beds is drying the air (adsorbing water vapor), the heat of adsorption is being liberated. This heat is conducted through the common metal heat conducting wall to the other desiccant bed which is humidifying the air and regenerating the bed. This heat assists in the desorption of the adsorbed water vapor. By recovering the heat of adsorption of the one desiccant bed and utilizing this heat energy to regenerate the other desiccant bed, it is possible to minimize the pressure reduction of the air stream required for the desiccant bed regeneration. To further assist in the utilization of this heat energy, the outside wall of the outer tower is deliberately made of an insulator such as plastic to prevent heat losses from occurring through those walls.

I claim:

1. A purifier for removing carbon monoxide from compressed air comprising:

A. a valve means for receiving compressed air;

B. a first tower communicating with the valve means and containing a dehumidifying agent and a carbon monoxide converting agent;

C. a pressure reducer means communicating with the first tower for receiving and reducing the pressure of all the compressed air;

D. a second tower communicating between the pressure reducer means and the valve means for receiving all the compressed air from the pressure reducer means and directing it to the valve means, said tower containing a carbon monoxide converting agent and a rehumidifying agent; said valve means adapted to reverse the direction of the compressed air flow between the towers so that dehumidified, compressed air simultaneously is rehumidified and the rehumidifying agent is converted into the dehumidifying agent by the expansion of all the pressure reduced compressed air, whereby there is no intentional loss of compressed air and water in the purifier and no external heat for converting the rehumidifying agent to the dehumidifying agent.

2. The purifier of claim 1, said second tower being positioned concentrically about the first tower and having a common heat conducting wall therewith.

3. The purifier of claim 1, said valve means comprising a reversible four-way valve, said valve in a first position directing compressed air to be treated into the first tower and receiving treated air from the second tower and in a second position directing compressed air to be treated into the second tower and receiving treated air from the first tower.

4. The purifier of claim 1, said dehumidifying and rehumidifying agents being selected from the desiccant group consisting of alumina, silica gel and a molecular sieve and said carbon monoxide converting agent being hopcalite.

5. The purifier of claim 1, said pressure reducer means comprising two differential pressure regulator valves in parallel so as to maintain a constant pressure drop irrespective of the total air flow or direction of flow.

6. A purifier for removing carbon monoxide from compressed air comprising:

A. a four-way main valve for receiving compressed air;

B. a first tower communicating with the valve and including a section containing desiccant for receiving and dehumidifying the compressed air and an adjacent section containing hopcalite for converting carbon monoxide in the compressed air to carbon dioxide;

C. a pressure reducer communicating with the first tower for receiving and reducing the pressure of all the compressed air from said adjacent section;

D. a second tower communicating between the pressure reducer and the main valve, said second tower including a section containing hopcalite for receiving all the reduced pressure compressed air and converting carbon monoxide to carbon dioxide and an adjacent section containing a moist desiccant for rehumidifying the air prior to the air's return through and out of the main valve; whereby reversal of the main valve reverses the direction of flow of the compressed air and regeneration of the desiccant occurs by the expansion of the pressure reduced air without an external heat source and there is no intentional loss of compressed air or water in the purifier.

7. The purifier of claim 6, said first tower concentrically positioned within the second tower and defined in part by a common heat conductive wall between at least the desiccant sections, said second tower defined in part by a heat insulating wall spaced from the common wall.

8. A purifier for removing carbon monoxide from compressed air comprising:

A. an outer casing having a first and second port at one end thereof;

B. a first tower positioned within the casing in communication with the first port and defined by an annular heat conducting wall and foraminous end walls, said first tower containing a layer of desiccant at the first port end and a layer of hopcalite adjacent the desiccant;

C. a second tower positioned concentrically about the first tower and in communication with the second port so that the heat conducting wall is common to both towers, said second tower defined by a heat insulating wall adjacent the casing and foraminous end walls, said second tower containing a layer of desiccant at the second port end and a layer of hopcalite adjacent the desiccant;

D. a pressure reducer communicating between the first and second tower to pressure reduce all of compressed air passing therebetween; and E. a reversible four-way valve communicating with the first and second port so as to direct compressed air into one of the ports and receive rehumidified substantially carbon monoxide free air from the other of the ports; whereby regeneration of said desiccant occurs by the expansion of the pressure reduced air without an external heat source and there is no intentional loss of compressed air or water in the purifier.

9. The purifier of claim 8, said pressure reducer communicating between said common wall for reducing the pressure of all said compressed air.

10. A method for removing carbon monoxide from compressed air comprising in sequence:

A. dehumidifying the compressed air by passing a volume thereof through a first desiccant in a first tower;

B. converting the carbon monoxide to carbon dioxide by passing said volume through a first batch of hopcalite in the first tower;

C. reducing the pressure of said volume of compressed air;

D. further converting carbon monoxide to carbon dioxide by directing said volume through a second batch of hopcalite in a second tower;

E. rehumidifying the volume of compressed air by passing said volume through a second desiccant containing moisture in the second tower and simultaneously regenerating said second desiccant through the expansion of the pressure reduced volume of compressed air; and F. reversing the flow by passing a second volume of compressed air through the second tower when the second desiccant is substantially regenerated, whereby there is no intentional loss of compressed air and water in carrying out the method and no external heat is necessary for regeneration of said desiccant.

* * * * *